United States Patent [19]

Hardwicke

[11] 4,135,765

[45] Jan. 23, 1979

[54] WHEEL ADAPTER

[75] Inventor: Robert L. Hardwicke, Troy, Mich.

[73] Assignee: Arrowcraft Products, Inc., Troy, Mich.

[21] Appl. No.: 770,750

[22] Filed: Feb. 22, 1977

[51] Int. Cl.² .................................................. B60B 11/00
[52] U.S. Cl. .................................... 301/36 R; 301/128
[58] Field of Search ................... 301/36 R, 9 DN, 128

[56] References Cited

U.S. PATENT DOCUMENTS

| | | | |
|---|---|---|---|
| 1,635,895 | 7/1927 | Michelin | 301/9 DN X |
| 2,067,620 | 1/1937 | Johnston et al. | 301/36 R |
| 2,416,862 | 3/1947 | Baker | 301/36 R |
| 2,597,835 | 5/1952 | Eksergian | 301/9 DN |
| 2,970,008 | 1/1961 | Leach | 301/9 DN X |
| 3,361,482 | 1/1968 | Stevens | 301/9 DN |
| 3,820,851 | 6/1974 | Longo et al. | 301/9 DN |

FOREIGN PATENT DOCUMENTS

| | | | |
|---|---|---|---|
| 1755511 | 8/1971 | Fed. Rep. of Germany | 301/9 DN |
| 259644 | 10/1926 | United Kingdom | 301/36 R |

*Primary Examiner*—Stanley H. Tollberg
*Assistant Examiner*—Charles A. Marmor

*Attorney, Agent, or Firm*—Gifford, Chandler, VanOphem, Sheridan & Sprinkle

[57] ABSTRACT

An adapter is provided for attachment to the hub of a vehicle axle whereby after attachment of the adapter to the hub, a pair of coaxial wheels can be secured to the adapter. The adapter is of simple construction and comprises a tubular cylindrical housing having a first and second set of circumferentially spaced axial bores formed therethrough. The first set of axial bores register with studs protruding axially outwardly from the axial hub of the vehicle so that the housing can be positioned over and secured to the axle hub by the appropriate nuts. The second set of axial bores is provided through the housing so that one bore from this second set is positioned between each pair of axial bores from the first set. A bolt is positioned through each of the second set of axial bores so that the threaded ends of the bolts extend axially outwardly from the housing. The outwardly extending ends of the bolts in turn register with mounting holes formed in a pair of coaxially mounted wheel rims which are positioned onto the adapter so that the bolts extend through the mounting holes in the wheel rim. Appropriate nuts, thereafter, threadably engage the bolts to secure both wheel rims onto the adapter.

8 Claims, 5 Drawing Figures

WHEEL ADAPTER

BACKGROUND OF THE INVENTION

I. Field of the Invention

The present invention relates to an adapter for attachment to the hub of a vehicle axle for attaching dual wheels to the axle hub.

II. Description of the Prior Art

Virtually all vehicles, such as automobiles, pickup trucks, and the like, include a front and rear axle with a hub at each end for attachment to a single wheel rim of a wheel. Consequently, the entire weight of the vehicle, plus its load, is supported by four wheels, i.e., two front wheels and two back wheels.

When the vehicle is intended to carry heavy loads, however, it is advantageous to provide dual or tandem wheels on the rear axle of the vehicle. Dual wheels virtually eliminate any chance of rear wheel blowouts which is a major cause of pickup camper accidents and the like. Additionally, dual wheels increase the stability and improve the handling of heavily loaded vehicles and also improve traction in both summer and winter. Moreover, the load carrying capacity of the vehicle is increased by dual wheels while simultaneously prolonging tire life.

For two separate reasons, it is virtually impossible to directly secure dual wheels to the axle hub of most vehicles. First, the outwardly extending studs on the axle hub for attaching the wheel rim to the hub are too short to accommodate two coaxially mounted wheel rims as are necessary with dual wheels. Secondly, even if dual wheels could be directly attached to the axle hub, the inner side of the inner wheel would contact and rub against the wheel well of the vehicle.

In order to overcome these above-mentioned problems, there are previously-known wheel adapters for attaching dual wheels to the axle hub of a vehicle and one such adapter is disclosed in U.S. Pat. No. 2,067,620 which issued on Jan. 12, 1937, to S. H. Johnston et al. These previously-known wheel adapters, however, suffer several disadvantages and, as a result, have not enjoyed widespread acceptance or use.

One disadvantage of these previously-known wheel adapters is that these adapters are constructed of cast iron and consequently are relatively expensive to construct. Moreover, cast iron is brittle and after prolonged use tends to fracture which, needless to say, presents a serious safety hazard.

Another disadvantage of these previously-known wheel adapters is that one wheel rim must be mounted between the wheel hub and the adapter while the other wheel rim is mounted to the outwardly extending axial end of the wheel adapter. Consequently, in order to remove the inner wheel from the vehicle, it is necessary to remove not only the outer wheel, but also the wheel adapter. The necessity of removing the wheel adapter in order to remove the inner wheel is not only time consuming, but also awkward in practice.

SUMMARY OF THE PRESENT INVENTION

The present invention overcomes the above-mentioned disadvantages of the previously-known wheel adapters by providing a wheel adapter constructed of high strength steel which is secured onto the hub of a vehicle axle and in which the wheels can be removed from the adapter without removing the adapter from the vehicle axle hub.

In brief, the wheel adapter of the present invention comprises a tubular cylindrical housing of a high quality steel which advantageously can be cut from tubular cylindrical bar stock. A first set of circumferentially spaced axial bores are machined through the housing which register with and receive therethrough the outwardly extending studs from the vehicle axial hub. Thus, the housing is directly attached to the axle hub by the appropriate nuts.

A second set of circumferentially spaced axial bores are also machined through the housing. Elongated bolt members are positioned through each bore of this second set so that the threaded ends of the bolt members extend axially outwardly from the housing. A pair of dual wheels having wheel rims with mounting apertures formed therethrough are positioned over the wheel adapter of the present invention so that the bolt members register with and extend through the mounting apertures on both of the dual wheels. The appropriate nuts then threadably engage the ends of the bolt members to secure both wheel rims onto the wheel adapter of the present invention.

BRIEF DESCRIPTION OF THE DRAWINGS

A better understanding of the present invention will be had upon reference to the following description when read in conjunction with the accompanying drawings wherein like reference characters refer to like parts throughout the several views, and in which.

DETAILED DESCRIPTION OF THE PRESENT INVENTION

Figure 1:
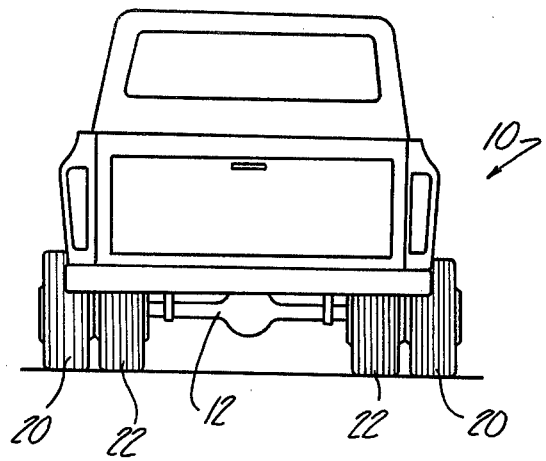
FIG. 1 is a rear plan view illustrating a vehicle utilizing the wheel adapter of the present invention.
Figure 2:
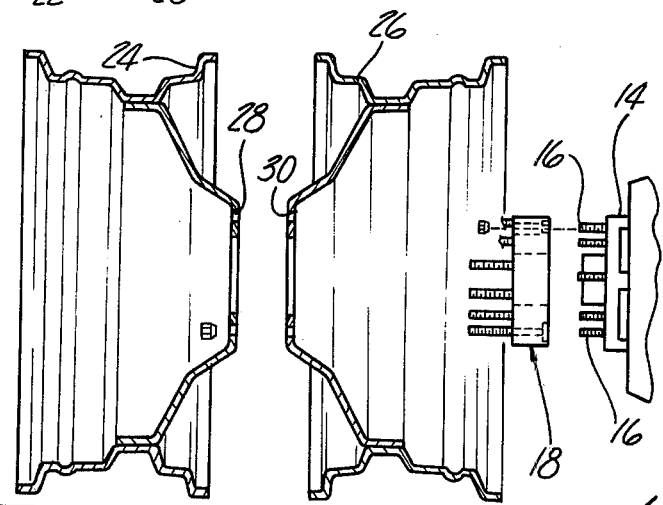
FIG. 2 is an exploded partial cross-sectional view illustrating the attachment of the wheel adapter of the present invention to a vehicle.

With reference now to FIGS. 1 and 2, a vehicle 10, such as a pickup truck, is thereshown having a rear axle 12 with a wheel mounting hub 14 (only one of which is shown) at each axial end of the rear axle 12. In the conventional fashion, the mounting hub 14 includes a plurality of circumferentially equal distantly spaced threaded mounting studs 16 which protrude axially outwardly from each axle hub 14. In a manner which will hereinafter be described in greater detail, a wheel adapter 18 according to the present invention permits an outer and inner wheel 20 and 22, respectively, to be secured to each wheel hub 14. In the conventional fashion, each of the wheels 20 and 22 includes a wheel rim 24 and 26, respectively, with conventional circumferentially spaced mounting apertures 28 and 30 formed therethrough for the attachment of the wheel 20 and 22 to the vehicle axle 12.

Figure 3:
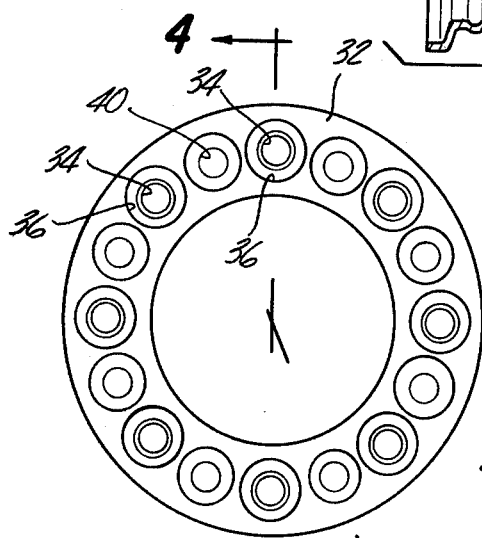
FIG. 3 is a front plan view illustrating the wheel adapter of the present invention.
Figure 4:
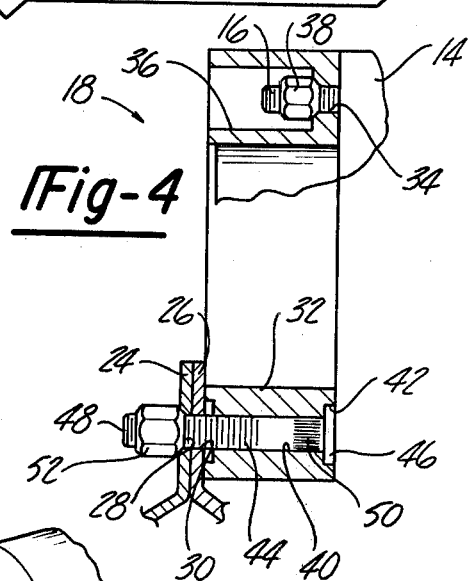
FIG. 4 is a partial sectional view taken substantially along line 4—4 in FIG. 3.

Referring now particularly to FIGS. 2–4, the wheel adapter 18 comprises a tubular and cylindrical housing 32 constructed of a high quality steel. A plurality of circumferentially spaced axial bores 34 each having an enlarged diameter portion 36 are machined through the housing 32 so that the bores 34 register with and receive the mounting studs 16 therethrough. The free threaded end of each stud 16 protrudes into the enlarged diameter portion 36 of its respective bore 34. An appropriate nut 38 thereafter threadably engages each mounting stud 16 to thereby secure the housing 32 coaxially to the axle hub 14. It will also be appreciated that the enlarged diameter portion 36 of the bore 34 is large enough to permit not only the insertion and rotation of the nut 38 but also the insertion of the appropriate tool, e.g., a socket wrench, into the enlarged diameter portion 36 and around the nut 38 to rotatably drive the same.

A second set of circumferentially spaced axial bores 40 are machined through the housing 32 so that one bore 40 is positioned between each pair of bores 34. Each bore 40 includes a shallow enlarged diameter portion 42 at the inner axial end of the housing 32.

A bolt member 44 having an enlarged head 46 is press fit into each bore 40 prior to the attachment of the housing 32 onto the axle hub 14 so that the free end 48 of the bolt member 44 extends axially outwardly from the housing 32. Simultaneously, the head 46 of the bolt member 44 is recessed from the inner axial end of the housing 32 in the enlarged diameter portion 42 of the bore 40. In addition, the bolt member 44 preferably includes splines 50 around its periphery to further prevent the rotation of the bolt member 44 in the bore 40.

With the housing 32 secured to the vehicle hub 14 by the nuts 38, the bolt members 44 register with and are received through the mounting apertures 28 and 30 on the vehicle rims 24 and 26, respectively, so that the rims 24 and 26 abut against each other as is shown in FIG. 4. Thereafter, an appropriate nut 52 threadably engages the outwardly extending end of the bolt member 44. Upon tightening of the nuts 52 the wheel rims 24 and 26 are sandwiched between the nuts 52 and the housing 32 to thereby secure the wheel rims 24 and 26 to the wheel adapter 18 of the present invention. The axial length of the wheel adapter 18, of course, spaces the wheels 20 and 22 outwardly from the vehicle axle which prevents the inner wheel 22 from rubbing against the vehicle wheel well.

Figure 5:
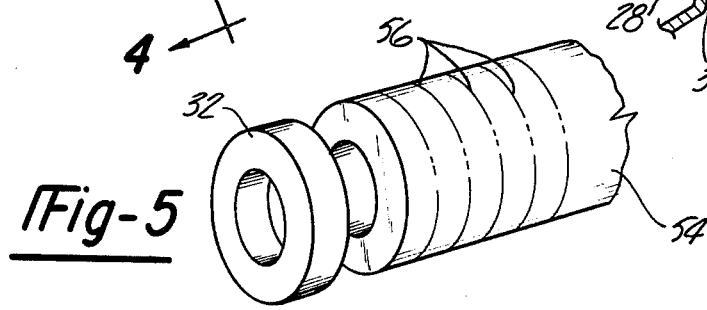
FIG. 5 is a perspective view illustrating one method of manufacture of the wheel adapter of the present invention.

FIG. 5 illustrates the preferred method of manufacturing the housing 32 for the wheel adapter 18 of the present invention. The housing 32 can be formed from readily available tubular cylindrical bar stock 54 by cutting the bar stock 54 along axially spaced, radial cut lines illustrated in phantom line at 56. This method of manufacturing the wheel adapter housings 32 not only permits the housings 32 to be constructed from high strength and high quality steel, but is also more economical and less expensive than the previously-known cast iron wheel adapters.

The wheel adapter 18 achieves many advantages over the previously-known wheel adapter. One such advantage is that the wheels 20 and 22 can be removed from the vehicle 10 without removing the wheel adapter 18 since the wheel adapter 18 is directly secured onto the axle hub 14.

Furthermore, the wheel adapter 18 of the present invention can be constructed from high quality and high strength steel, as has been previously mentioned, which is more economical and less expensive than the previously-known cast iron wheel adapters. Consequently, the durability and strength of the wheel adapter 18 is increased while the manufacturing cost is reduced over the previously-known wheel adapters. As a result the previously-known failure and fracturing of the previously-known wheel adapters under heavy loads and strain is entirely eliminated.

Having thus described my invention many modifications thereto will become apparent to those skilled in the art to which it pertains without deviating from the spirit of the invention as defined by the scope of the appended claims.

I claim:

1. For use in conjunction with a vehicle having an axle with a hub at at least one axial end, said hub having a plurality of outwardly extending circumferentially spaced threaded studs, said threaded studs each having an exposed threaded portion which extends outwardly from the hub a distance sufficient for attaching one axial side of one wheel to said hub, an adaptor for securing two substantially identical wheels to one hub, said wheels each having a flat portion in abutting relationship with the flat portion of the other said wheel, apertures in each of said flat portions, said apertures having the same spacing as said threaded studs, said adaptor comprising:

a tubular and cylindrical housing, said housing having an axial length greater than the length of the exposed threaded portions of the studs;

said housing having a first and second set of circumferentially spaced axial bores formed therethrough, said axial bores having a length substantially equal to the axial length of the housing, wherein said first set of bores register with and receive said exposed portions of said threaded studs therein;

a nut threadably engaging each of said threaded studs to thereby secure one axial end of said housing to said hub;

an elongated threaded member disposed in and through each bore of said second set so that one end of each of said threaded members extends axially outwardly from the other axial end of said housing, said threaded members being longer than the exposed portion of said threaded studs; and said threaded members extending through the apertures in said abutting flat portions of both of said wheels and a nut threadably engaging each of said elongated threaded members to selectively attach both of said wheels to said housing and thus to said hub and wherein the other axial side of one wheel abuts against the other axial end of the housing.

2. The invention as defined in claim 1 wherein said elongated threaded members are press fit into said second set bores.

3. The invention as defined in claim 2 wherein each of said elongated threaded members includes axial splines which coact with the housing to prevent rotation of said elongated threaded members in said second set of bores.

4. The invention as defined in claim 1 wherein each of said first set bores includes an axially outer enlarged diameter portion, adapted for rotatably receiving said first-mentioned nuts.

5. The invention as defined in claim 1 wherein said housing is constructed of steel.

6. The invention as defined in claim 5 wherein said housing is formed from tubular and cylindrical bar stock.

7. The invention as defined in claim 1 wherein the housing is of an axial length sufficient to space the inner wheel outwardly from the vehicle to thereby prevent the inner wheel from contacting the vehicle.

8. The invention as defined in claim 1 and in which the difference in length between the elongated threaded members and the exposed portion of the threaded studs is substantially equal to the axial width of the housing.

* * * * *